United States Patent [19]

Bridges

[11] Patent Number: 4,900,196
[45] Date of Patent: Feb. 13, 1990

[54] CONFINEMENT IN POROUS MATERIAL BY DRIVING OUT WATER AND SUBSTITUTING SEALANT

[75] Inventor: Jack E. Bridges, Park Ridge, Ill.

[73] Assignee: IIT Research Institute, Chicago, Ill.

[21] Appl. No.: 123,603

[22] Filed: Nov. 20, 1987

[51] Int. Cl.⁴ .............................................. E02D 27/00
[52] U.S. Cl. .................................. 405/267; 405/128; 405/131; 405/169
[58] Field of Search ............... 405/131, 267, 266, 128, 405/129, 258, 303

[56] References Cited

U.S. PATENT DOCUMENTS

| | | | |
|---|---|---|---|
| Re. 30,738 | 9/1981 | Bridges et al. | 166/248 |
| 464,771 | 12/1891 | Harris | 405/266 |
| 528,367 | 10/1894 | Harris | 405/266 |
| 695,583 | 3/1902 | Schietkiewics | 405/266 |
| 2,099,328 | 11/1937 | Casagrande | 204/1 R |
| 2,235,695 | 3/1941 | Ackley | 405/131 |
| 2,333,287 | 11/1943 | Baird | 405/268 |
| 3,251,975 | 5/1966 | Hugenholtz | 405/131 |
| 3,262,274 | 7/1966 | Nelson, Jr. | 405/266 |
| 3,379,013 | 4/1968 | Slagle et al. | 405/266 |
| 3,608,318 | 9/1971 | Levy et al. | 405/266 |
| 3,656,306 | 4/1972 | Thorpe | 405/131 |
| 3,688,507 | 9/1972 | Muller | 405/267 |
| 3,690,106 | 9/1972 | Tregembo et al. | 405/266 |
| 3,800,544 | 4/1974 | Nakanishi | 405/266 |
| 4,073,152 | 2/1978 | Kishitani et al. | 405/268 |
| 4,244,664 | 1/1981 | Duverne | 405/263 |
| 4,309,129 | 1/1982 | Takahashi | 405/269 |
| 4,311,340 | 1/1982 | Lyons et al. | 166/281 |
| 4,326,820 | 4/1982 | Uerpmann et al. | 405/128 |
| 4,358,221 | 11/1982 | Wickberg | 405/128 |
| 4,375,930 | 3/1983 | Valiga | 405/267 |
| 4,376,598 | 3/1983 | Brouns et al. | 405/258 |
| 4,430,256 | 2/1984 | Rustum | 405/129 X |
| 4,449,856 | 5/1984 | Tokoro et al. | 405/269 |
| 4,465,401 | 8/1984 | Stoddard et al. | 405/258 |
| 4,496,268 | 1/1985 | Ressi di Cervia | 405/133 |
| 4,545,435 | 10/1985 | Bridges et al. | 166/248 |
| 4,634,187 | 1/1987 | Huff et al. | 405/128 |
| 4,646,277 | 2/1987 | Bridges et al. | 367/191 |
| 4,670,634 | 6/1987 | Bridges et al. | 219/10.41 |
| 4,687,372 | 8/1987 | Thornton | 405/128 |

FOREIGN PATENT DOCUMENTS

| | | | |
|---|---|---|---|
| 0609386 | 9/1960 | Italy | 405/131 |
| 0837997 | 6/1981 | U.S.S.R. | 405/131 |

OTHER PUBLICATIONS

EPRI CS-4839, "In Situ Vitrification of PCB-Contaminated Soils," Electric Power Institute Report EPRI CS-4839, Oct. 1986.

*Primary Examiner*—Dennis L. Taylor
*Attorney, Agent, or Firm*—Fitch, Even, Tabin & Flannery

[57] ABSTRACT

To provide confinement in a porous medium in the earth, a limited region of the porous medium is heated to drive substantially all of the free water from open spaces of the medium in the region. After heating, liquid material is introduced into the open spaces in the medium, which liquid material will set into a substantially solid structure. The liquid material is then set in the open spaces to form a substantially solid structure in the medium in the region.

24 Claims, 4 Drawing Sheets

CONDUCTIVITY OF SOIL & CLAY AT 0.5 MHz & 10 MHz

CONFINEMENT IN POROUS MATERIAL BY DRIVING OUT WATER AND SUBSTITUTING SEALANT

BACKGROUND OF THE INVENTION

This invention relates generally to the confinement of material in a porous medium in the earth, especially for containing hazardous wastes, and more particularly to providing such confinement by heating a limited region of the earth to drive off water and replacing the water with a sealant.

Hazardous waste materials have been improperly deposited in thousands of sites all over the United States and, indeed, all over the world. Uncontrolled landfills have been used as convenient, but inadequate, disposal sites for industrially generated wastes, while other sites have been contaminated by accidental spills of hazardous materials. There are also conditions where hazardous materials are stored or carried in confining tanks, pipes or ditches where the confining walls may leak materials into the earth. There are many sites where hazardous materials were spilled prior to the discovery of the hazardous nature of the materials being handled. Many hazardous materials are difficult to dispose of because they are stable, do not undergo environmental degradation at reasonably fast rates, have high boiling points, are considered toxic at very low concentration levels, and/or bioaccumulate in various species of the food chain at concentrations higher than that naturally occurring in the environment.

A common way of dealing with hazardous waste deposited in the earth has been to excavate the site and incinerate the materials to destroy the hazardous waste. This solution has proven relatively impractical in many cases because of the high cost of excavation and incineration, the shortage of incineration capacity, inadequate methods and capacity for ash disposal in the incinerators, and the hazards and risks associated with site disturbance and transportation.

One alternative to excavation has been the in situ decontamination of waste as shown in Bridges et al. U.S. Pat. No. 4,670,634, wherein radio frequency heating applied to the sites is used to render the materials innocuous, as by pyrolyzing noxious materials or driving off effluents that can be captured and incinerated.

An alternative to removing the hazardous wastes has been to contain them. One such containment scheme is shown in Brouns et al. U.S. Pat. No. 4,376,598 which shows conduction heating to very high temperatures of radioactive components in soil, the soil being heating to vitrification at temperatures as high as 1500° C. At such temperatures radioactive contaminants are fused with the silicates in the soil to form a glass or similar product which, upon cooling, forms a stable mass. It is also known to encapsulate hazardous material in impervious materials, as shown in Valiga U.S. Pat. No. 4,375,930.

It is known to isolate a volume of the earth by drilling holes around the volume and pumping down grouting to form a barrier, as shown in Lyons et al. U.S. Pat. No. 4,311,340. It is also known to form a structure beneath the surface of the earth, without excavation, by injecting cement at appropriate places, as shown by Harris U.S. Pat. No. 528,367. Muller U.S. Pat. No. 3,688,507 also discloses a method for providing barriers by forcing grouting into regions where the barriers are to be created. Levy et al. U.S. Pat. No. 3,608,318 discloses a method and apparatus for injecting hot asphalt into relatively permeable earth formations to form water impervious dikes.

SUMMARY OF THE INVENTION

In accordance with the present invention a limited region of porous material in the earth is heated to evaporate water from the porous material. The water is then replaced with a liquid material which will set into a substantially solid structure. The liquid material may be hot asphalt, as in the method or Levy et al.; however, the Levy et al. method was often difficult to perform because it was difficult to introduce the asphalt in the presence of water. In accordance with the present invention, the water is first removed so that the earth is not water wet, leaving it absorptive of the liquid sealant. More particularly, the earth is heated in the limited region to vaporize substantially all of the free water from the open spaces of the earth media in that region.

Free water is water that is not bound water. Bound water is water that is physically or chemically bonded to the earth media. This includes water of hydration, inorganic crystalline species such as gypsum, intercalated water such as water absorbed within silicious layers of clays such as bentonite, or water otherwise physically adsorbed by the media. In general, free water is that water which can be boiled off at or near the boiling point of water at ambient pressure. The free water may be contained in the interstitial spaces in the earth. In most cases, the spaces are interconnected pores so as to render the earth media permeable. On the other hand, the free water may be contained in closed pores from which the water does not readily escape.

In accordance with the present invention, the porous earth media are heated over a limited region to vaporize the water therein so as to drive substantially all of the free water from the open spaces of the media in the limited region. This leaves dry, open spaces that are interconnected, providing permeability whereby a sealing medium in the form of a liquid which will harden into a solid can be introduced into the open spaces. The liquid materials are then set to provide an impermeable barrier. The term "set" is used herein in the sense of being made firm or substantially solid and may include the process of cooling to provide a change of state from liquid to solid or chemical reactions such as polymerization. Substantially solid includes the condition where the material is so viscous that there is substantially no fluid flow. To the extent that the heated region itself contains hazardous material, the liquid material introduced into the spaces will encapsulate the hazardous material. Preferably, the liquid material has a contact angle in respect to a medium as to wet the medium and draw the material into the pores of the medium by capillary attraction. This permits the liquid material to be introduced at atmospheric pressure. However, it is also contemplated to apply pressure to force the material into the spaces more quickly and thoroughly. The material may be introduced through pipes disposed in the limited region. The material is preferably a material that is solid at ambient temperature and is heated to melt it prior to its introduction into the spaces. Preferred thermosetting materials are asphalt and low-density polyethylene.

In one form of the invention the barrier is created around a contained volume. This may be by creating what amounts to thick impermeable walls extending from the surface of the earth to a substantially impermeable zone in the earth. The invention also includes creating a barrier completely surrounding a contained volume extending from the surface of the earth around and under the volume.

A preferred method for heating the limited region of the earth is by electrical means such as the tri-plate line shown in Bridges et al. U.S. Reissue Patent No. Re. 30,738. An alternative would be to use hot pipes which transfer heat by thermal conduction. The pipes could be heated either by electricity, steam or gases.

Although it is important that substantially all of the free water be vaporized from the open spaces in order that the liquid material can be introduced, it is also contemplated to continue the heating above the temperature at which water boils at atmospheric pressure in order to drive a substantial amount of free water from closed pores and then to continue heating to drive a substantial amount of the bound water from the media. In the case of clay media, for example, the removal of bound water will cause the clay to shrink and crack and provide much greater permeability than is created simply by removing the free water.

Numerous tests of heating soils and clays have established that considerable shrinkage of the soils or clays occurs. The soil fractures and forms fissures, both macroscopic and microscopic. This provides two mechanisms for the penetration of the sealant, flow through larger fissures and penetration by capillary forces. Capillary forces are effective for small or large particles of the soil, so long as the individual capillary tubes are continuous. In order to assure that the sealant penetrates the soil by capillary forces, any fissures are first filled with a highly fluid and mobile sealant. These fissures are interconnecting and quite numerous. Solidification of the sealant which is placed into these fissures would probably provide an adequate impermeable barrier or encapsulant. However, the barrier or encapsulant is further improved by the action of capillary forces sucking the sealant from the fissures into the main body of the particles of the medium. It is desirable in some soils to gently fill the fissures with the sealant. This is preferably done at low pressures to avoid massive fracturing of the soil which could result in waste of the sealant material.

It is thus an important aspect of the present invention to confine material in a porous medium in the earth by heating a limited region of the earth to drive off free water from the open spaces of the earth, then introducing a liquid material into the open spaces which will set into a substantially solid state, to form a substantially solid structure. These and other aspects, objects and advantage of the present will become apparent from the following detailed description, particularly when taken in conjunction with the accompanying drawings.

DETAILED DESCRIPTION OF PREFERRED EMBODIMENT

As mentioned above, the present invention provides for confinement of material in a porous medium of the earth. The present invention can be used for a great number of purposes involving such confinement of material. Large fuel or waste storage tanks that are beginning to leak are prime candidates for the application of the present method, for ultimately it would be necessary to construct new tanks at great expense. To avoid this possibility, or at least to extend the life of existing storage tanks, the installation around and beneath these tanks of barriers impermeable to fluids would contain leaks as they develop.

Conventional methods do not offer much hope for introducing an impermeable barrier. For example, although mining methods could be used to excavate the earth material from underneath the leaking tanks, this is a formidable problem, particularly because of the hazards of excavating the noxious materials. One means for correcting the leaks would be the construction of a new tank to store the wastes or fuels. Another method for controlling the flow would be to install a subsurface dike. Although dikes constructed by conventional means such as plastic films or walls of concrete, might be practical for shallow depths, at some sites it would be necessary to provide dikes over 100 feet in height to intersect an impermeable clay layer. In this case, the conventional methods of embedding a dike would be very difficult, if not impossible, to use. With the present invention, the installation of such a dike is both feasible and economic. The present invention thus has application wherever such containment is desired and excavation is difficult, costly or even impossible.

Figure 1:
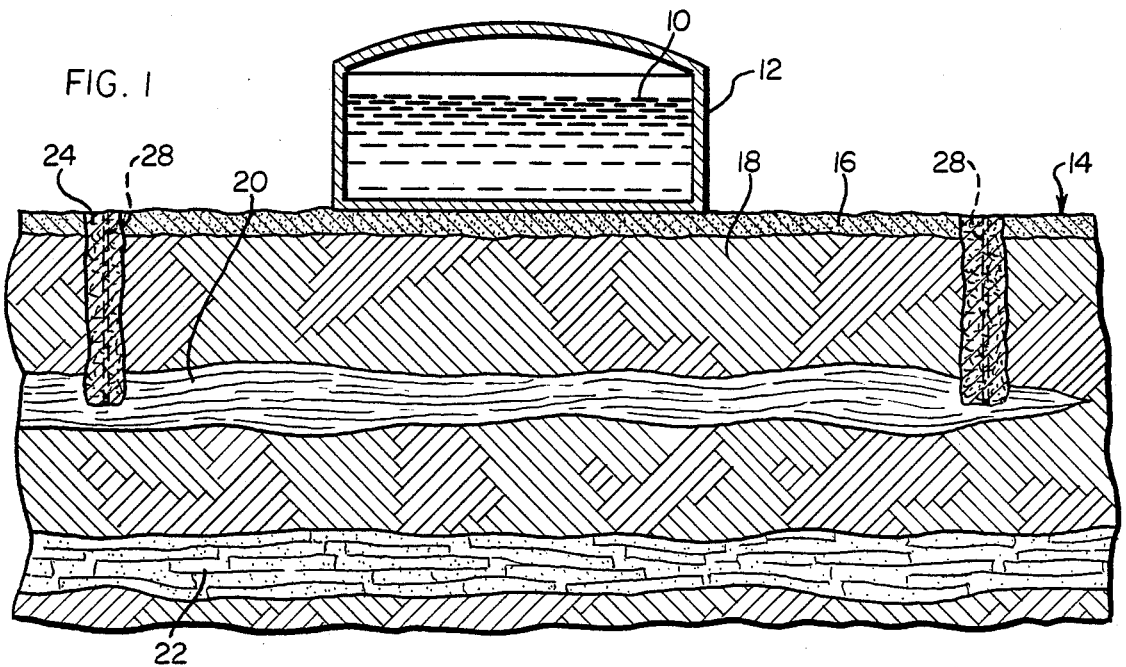
FIG. 1 is a vertical sectional view, partly diagrammatic, of a confinement barrier formed in the earth in accordance with the present invention for confining materials as might leak from a tank.

In FIG. 1 is illustrated one use of the present invention in a representative section of the earth with a top soil covering a moderately permeable subsoil with a relatively impermeable zone therebelow and a permeable aquifer below that. As illustrated in FIG. 1, the present invention has application in isolating hazardous waste storage tanks from such an aquifer.

More particularly, FIG. 1 shows the installation of a confining barrier in accordance with the present invention for confining hazardous materials 10 as might leak out of a tank 12. The tank is disposed on the surface of the earth 14. The upper region of the earth is shown in FIG. 1 in a typical setting as including top soil 16 which is relatively loose and consolidated, and a subsoil 18 which is somewhat more consolidated but is nevertheless relatively permeable. The particular example shown in FIG. 1 includes a highly impermeable zone 20 which may typically be a clay lens. Under such circumstances hazardous waste leaking from the tank 12 would permeate through the top soil 16 and subsoil 18 to the impermeable clay zone 20 and then permeate therealong to the end of the lens where it would migrate further downward. This might permit flow of the hazardous waste to an aquifer 22, contaminating the water supplied therefrom.

In accordance with the present invention a dike 24 is emplaced around the tank 12 from the earth's surface 14 to the impermeable clay zone 20, thus sealing any contaminants within the dike and above the impermeable zone 20, protecting the water supply. To form the dike 24, the moisture is first evaporated from the region in which the dike is to be formed. This removes the water from the pore spaces in the soil and creates small, interlocked fissures. Soil temperatures of up to about 150° C. may be required to complete this evaporation. The fissures occur because most soils lose about 30% of their volume when completely dried.

Figure 2:
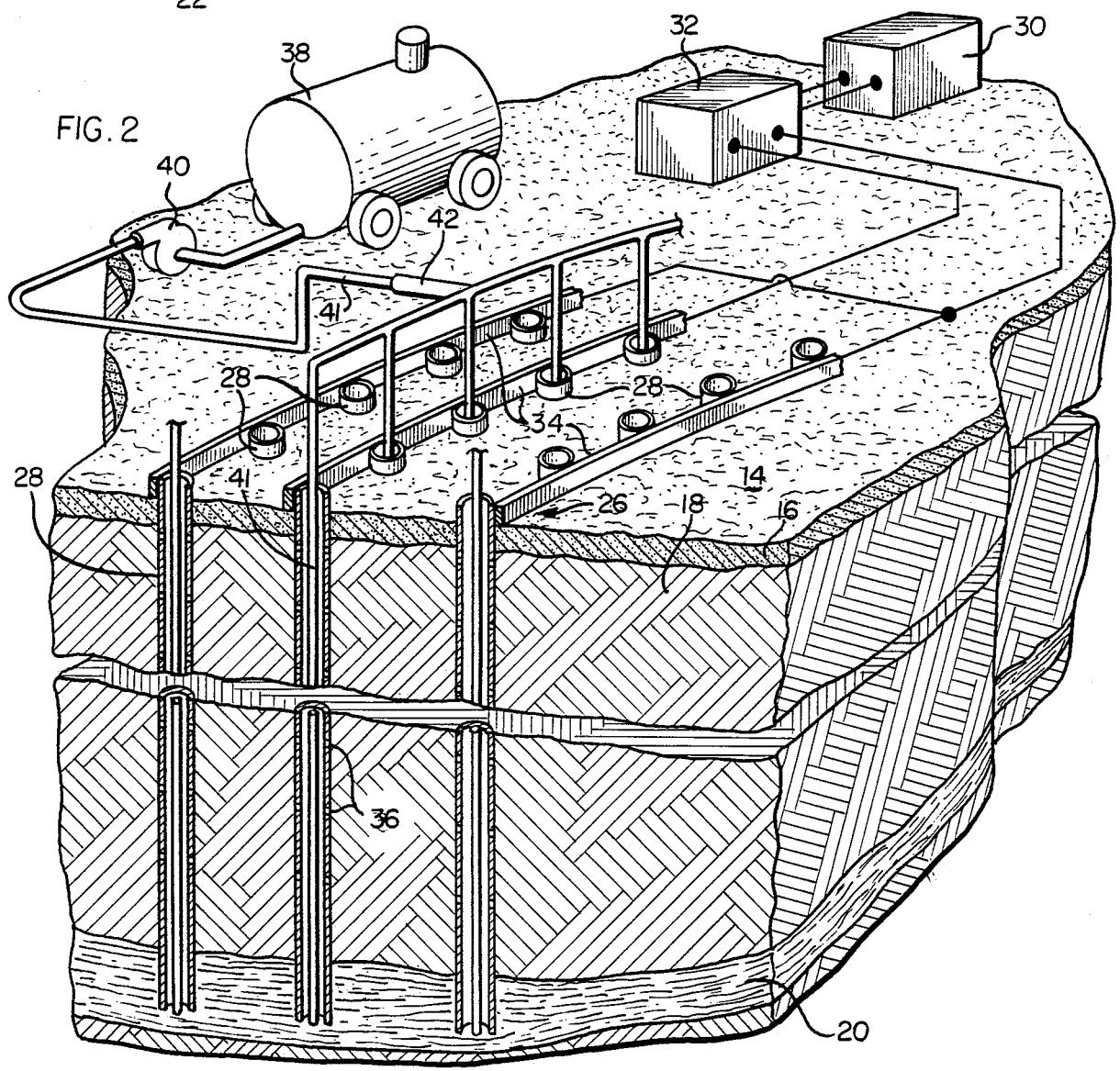
FIG. 2 is an illustration, partly in perspective with a vertical section and partly diagrammatic showing the installation of a tri-plate line for forming the barrier illustrated in FIG. 1.

As shown in FIG. 2, the heating can be achieved in place by exciting RF electrode arrays 26, substantially in the manner disclosed for the recovery of hydrocarbons in Bridges et al. U.S. Reissue Patent No. Re. 30,738, referred to above. After the moisture is driven out, a hot, highly mobile sealant, such as asphalt or low-density polyethylene, is injected into the dried region. The liquid sealant will readily flow into the interlocking fissures by gravity and between and into the dry soil particles by capillary attraction. The sealant may be material like melted bitumen, polyethylene, or wax, that will form a substantially solid moisture barrier upon cooling or curing.

Figure 3:
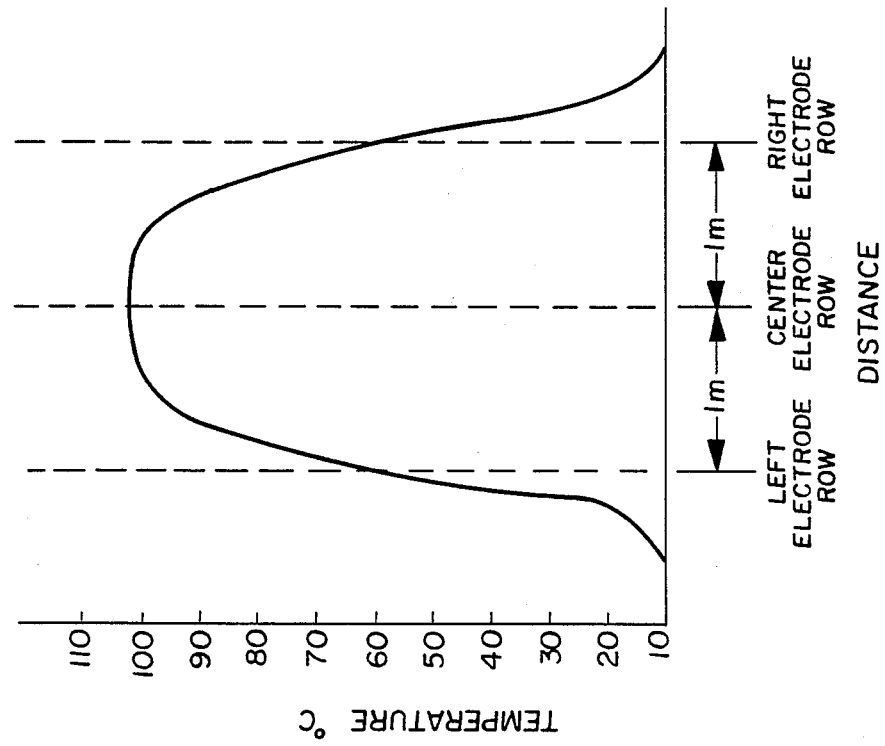
FIG. 3 is a graph of temperature in the earth as a function of distance from the electrodes of the tri-plate line shown in FIG. 2 during the heating of the earth with the tri-plate line.

In the preferred embodiment illustrated in FIG. 2, the electrode array 26 is in the form of a tri-plate line like that disclosed in Bridges et al. U.S. Reissue Patent No. Re. 30,738. Such tri-plate line simulates three parallel plates of electrodes or conductors 28 whose areal extent is large relative to the plate separation. A power source 30, which may be at radio frequency, applies a voltage through a matching network 32 and connector straps 34 between the inner and outer rows of conductors 28. The outer rows are at ground potential. This creates a relatively uniform electric field that heats by conduction and dielectric absorption. This heating is quite pronounced until the water is evaporated, at which point the electromagnetic absorption characteristics of the earth decrease abruptly. Although the electric fields within the tri-plate line are reasonably uniform (with field concentrations occurring near the conductors), the temperature rise between the two outer rows of conductors is not uniform. This nonuniformity arises because of thermal outflow. One effect of thermal outflow is that the initial temperature rise of the two outer rows of conductors is roughly one-half the initial temperature rise of the interior of the deposit. Such temperature profile is illustrated in FIG. 3. If the heating is sufficiently rapid, however, a major segment between the two outer rows rises to a temperature sufficient to vaporize the water and condition the deposit to accept impregnating materials.

Impregnating materials are selected on the basis of their being liquid with relatively low viscosity above 100° C. and substantially solid at normal earth temperature, and being nonreactive with the leaking fluids. Typical compounds meeting these requirements are asphalts, low-density polyethylenes, paraffins and waxes. Other types of impregnating materials include thermosetting resins which are liquid and free-flowing at the injection temperature. For slowly curing thermosetting resins, the heat remaining in the soil can be used to assist hardening or polymerization. Additional electrical heating can be provided to cure the resins into a solid, especially if a free-flowing resin were injected into a dried but somewhat cooled soil. Free-flowing resins which require a curing agent can also be injected into dried soil which is either hot or somewhat cooled.

Hot impregnants are injected through perforations 36 in the electrodes 28 of the center row from a source 38 of heated sealant, pumped by a pump 40 through tubing 41 isolated from ground by an insulating segment 42. The flow of impregnants is aided by capillary forces into the hot formation, which has been depleted of water. The flow progresses outwardly in the earth until cooler regions are encountered. In these regions the impregnants cool, forming a plug and barrier. The impregnants are injected at low pressure until nearly zero permeability is indicated, that is, until the deposit will not accept further material. The impregnants are then allowed to cool to set and form the dike 24.

Impregnants are best injected at low pressure to avoid massively fracturing the earth and to avoid excessive use of sealant materials. Such massive fracturing occurs when the pressure of the injected fluids substantially exceeds the overburden pressure. Loosely compacted soils tend to rupture when the pressure of the injected fluid substantially exceeds (by a factor of three) the overburden pressure. For typical soil, this can be stated as follows:

$$P \leq 3h$$

where P is the pressure of the injected fluids in pounds per square inch and h is the height of the overburden in feet.

After the heating, the electrical apparatus is removed from the top portion of the electrode rows. Pumping systems, if needed, may be introduced into the outer rows of electrodes to pump or divert accumulated ground or subsurface water. The electrodes 28 remain in place, for they are designed to be expendable.

Figure 4:
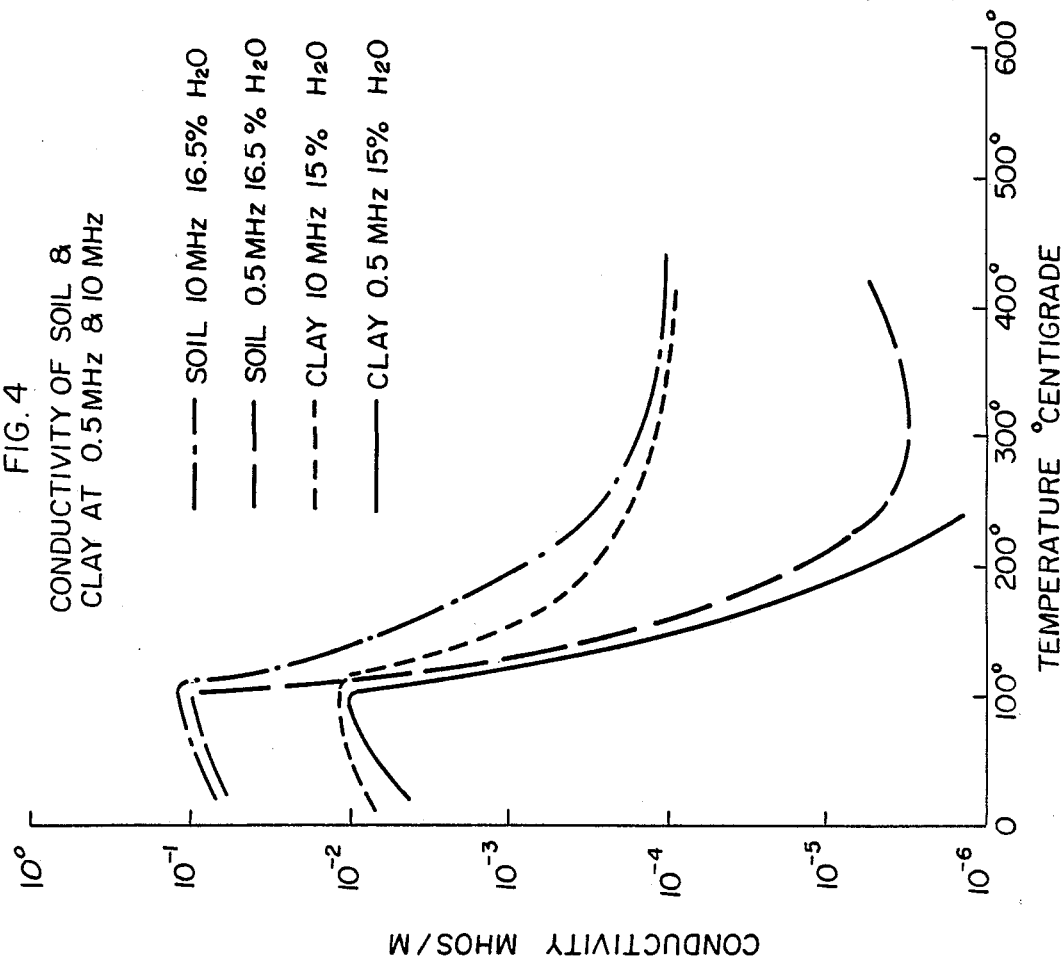
FIG. 4 shows graphically the relationship between conductivity and temperature for typical soils at typical energizing frequencies using the tri-plate line shown in FIG. 2.

The heating and boiling process is illustrated by example in FIG. 4, which shows graphs of conductivity in mhos/m as a function of temperature in °C. for two typical soils, one subsoil at 16.5% $H_2O$ and the other clay at 15% $H_2O$, at two frequencies of heating current, 10 MHz and 0.5 MHz. The conductivity of the soil represents the ability of the soil to absorb electromagnetic energy. As the temperature exceeds 100° C. by a few degrees, there is an abrupt drop in the conductivity, especially for the lower frequencies, such as 0.5 MHz. This is because part of the absorption of energy is due to conduction paths formed by water in interconnecting interstitial spaces. At higher frequencies such as at 10 MHz, the power dissipating capability is less dependent on this phenomenon and is more dependent on the dielectric absorption properties than on the ohmic properties of the soil. However, the presence of trapped water or bound water is still evident, for considerable absorption still takes place until the temperature reaches about 300° C., as shown for the clay and soil at 10 MHz.

The above phenomena can be explained in terms of free and bound water. The free water which appears in the interconnecting void spaces is responsible for most of the absorbing characteristics of the soil up to a few degrees above 100° C. When this water has boiled off, the ohmic conducting paths formed by interconnecting filaments of conductive water are destroyed. However, some water remains either trapped in blind pore spaces or as an anhydride or by some other physical or chemical mechanism. The presence of water as a polar molecule contributes heavily to the dielectric absorption at 10 MHz in contrast to the ohmic or conductive losses which are most evident at 0.5 MHz. Because the dielectric absorption is proportional to frequency, these bound or trapped polar water molecules contribute significantly to the absorption at the higher frequencies. Such molecules can only be driven off by heating the material to temperatures approaching 300° C.

Temperatures much in excess of 300° C. are not required to achieve the goals of this invention. While higher temperatures can be realized by electric heating, such a realization could require excessive amounts of electrical power. In some cases, very high temperatures, on the order of 1500° C., can vitrify the soil and accomplish a similar goal, but only at the expense of considerable amounts of costly electrical power.

From the above it is evident that the principal impediment to the ingress of a sealant is the free water which exists in the interconnecting interstitial spaces of the soils or clays. However, for certain soils and clays, additional wettability and penetration of the sealant may be achieved by raising the soils, especially clays, to a higher temperature by opening up blind pores and chemically or physically altering the soil by driving off the bound water. Depending on the soil, such a process may increase the wettability of the soil to a particular sealant.

Figure 5:
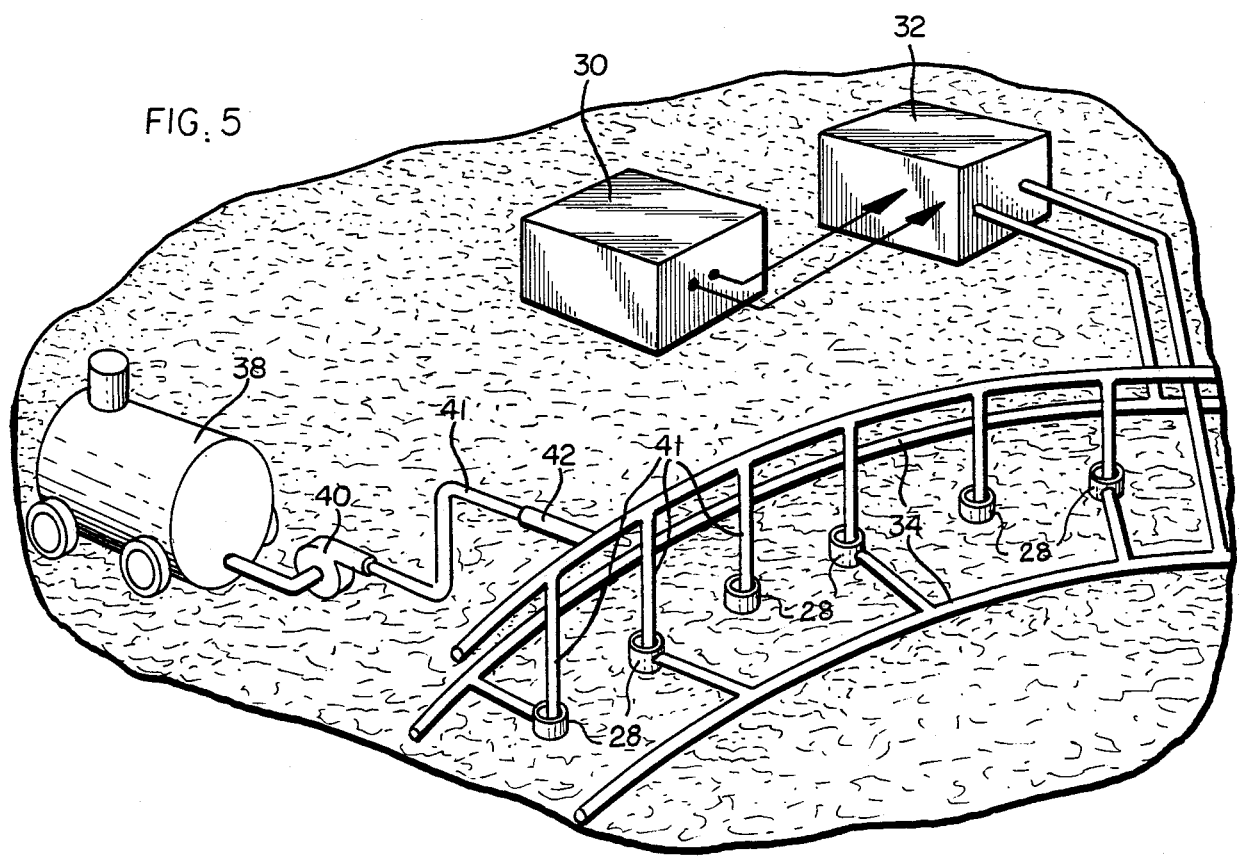
FIG. 5 is an illustration, partly in perspective and partly diagrammatic, showing an alternative heating system comparable to that shown in FIG. 2 but having a single row of electrodes.

An alternative embodiment of the invention for forming a dike 24 is illustrated in FIG. 5 utilizing a single row of electrodes 28 with alternate electrodes of opposite polarity or phase, but otherwise utilizing the same heating system as shown in FIG. 2. The electrodes 28 are alternately excited as shown. Initially the heating is by ohmic or conduction currents flowing between the electrodes. As these currents flow, because of the concentration of the current near the electrodes, the water is evaporated near the electrodes. By proper selection of frequency, such as a relatively low frequency, the heating around the electrodes can be curtailed because the water has been driven out and the conductivity reduced, yet the heating of the moisture filled high conductivity material between the electrodes can be continued by displacement currents. The process is continued until substantially all of the free water has been driven out of the material in the vicinity of the electrodes. By such a process the temperature of the material between the electrodes can be elevated to well over 120° C., thereby driving out the moisture and conditioning the soil to accept a sealant.

Figure 6:
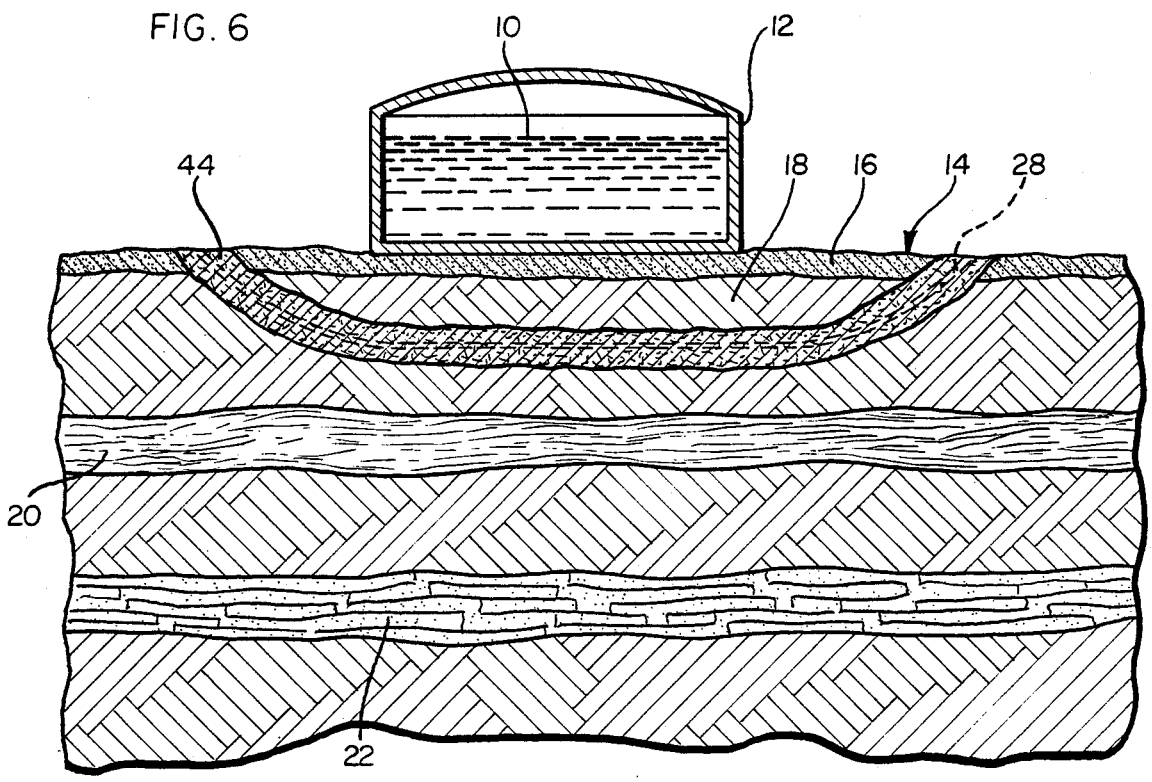
FIG. 6 is a vertical sectional view, partly diagrammatic, of an alternative confinement barrier formed in the earth in accordance with the present invention.
Figure 7:
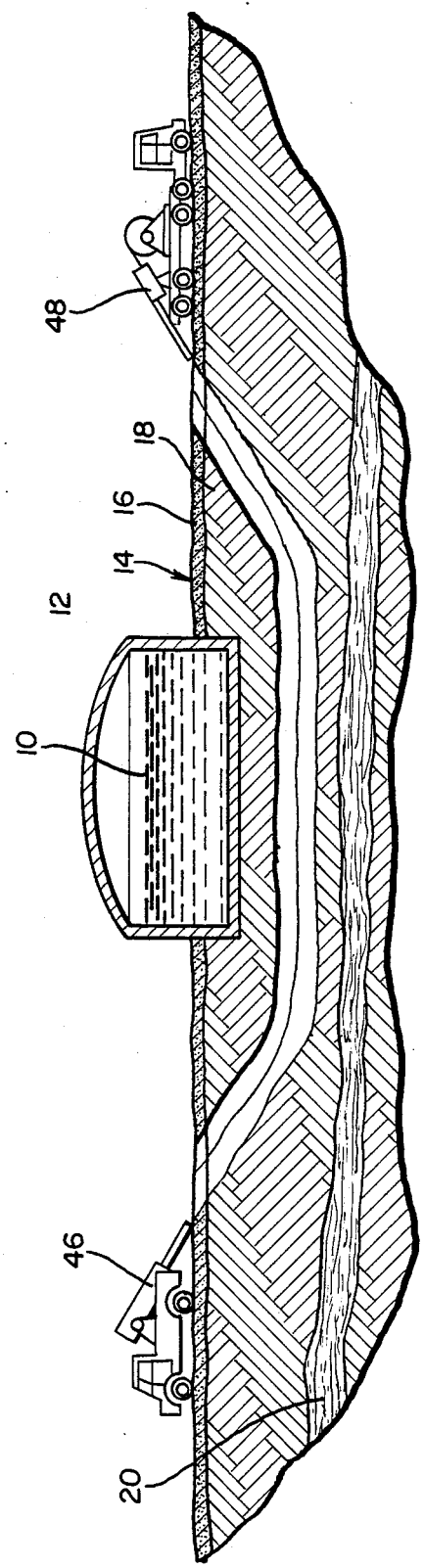
FIG. 7 is a vertical section view, partly diagrammatic, showing the installation of the heating system for forming the barrier illustrated in FIG. 6.

It is sometimes uneconomical or impractical to form a vertical dike 24 down to an impermeable zone 20, as, for example, where the impermeable zone is relatively deep or where there is no impermeable zone 20 above the aquifer to be protected. In such case a cup-shaped barrier 44 may be provided around and below the tank 10 as illustrated in FIG. 6. The barrier 44 may be created by the apparatus illustrated in FIG. 7, wherein a well known guided directional drill 46 may be used to drill holes in which the electrodes 28 are emplaced, as by an on site electrode former 48 well known in the art of in situ pipe manufacture. The electrodes may be emplaced in a tri-plate line as shown in FIG. 2 or in a single row as shown in FIG. 5. The electrodes 28 are then energized as described above in connection with FIGS. 2 and 5 to heat and dry the earth. Thereafter, the sealant is introduced as described above and allowed to cool to establish the impervious barrier 44.

Figure 8:
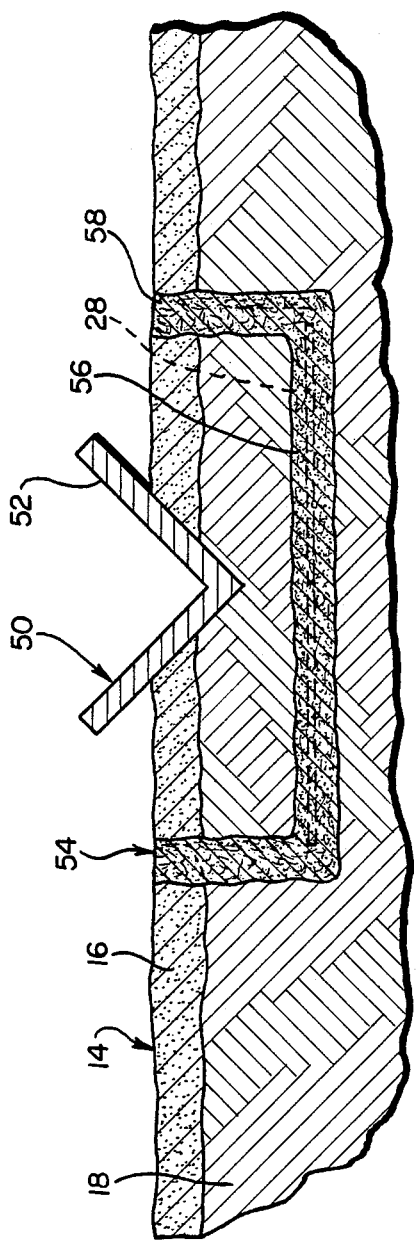
FIG. 8 is a vertical sectional view, partly diagrammatic, of an alternative confinement barrier formed in the earth in accordance with the present invention.

Another application of the present invention is in creating a barrier under a ditch 50 or other conduit carrying hazardous material, as shown in FIG. 8. The ditch 50 is normally lined with a lining 52 intended to be impervious. However, with the ravages of time and climate, such linings may crack or otherwise spring leaks that are sometimes better repaired or guarded against by emplacing a secondary barrier 54 according to the present invention. The secondary barrier 54 may be formed by directional drilling and the principles of the embodiment illustrated in FIGS. 6 and 7, or it may be made in separate parts with a floor 56 and walls 58. In the latter case, trenches may be dug on both sides of the ditch 50 and holes bored under the ditch between the trenches in the manner described in Bridges et al. U.S. Pat. No. 4,646,277. The electrodes 28 may then be emplaced and energized as described above to dry the earth. The sealant may then be introduced and cooled to form the floor 56 of the secondary barrier 54. The walls 58 may be formed by filling them with sealant or a mixture of sealant and filler, such as a mixture of asphalt and sand.

Other modifications may be made in accordance with the present invention. For example, the hazardous material may be confined by heating the waste and whatever the waste is disposed in, such as in the case of contaminated earth, to drive out moisture. Liquid sealant may then be added to the dried material, as above, and allowed to set to encapsulate the hazardous material. This will prevent noxious materials from being leached out into the soil and thence appearing in the groundwater.

Liquid sealants or encapsulants can be added when the dried soil is either hot or cool, depending on the nature of the sealant or encapsulant material. Heat transfer means other than electrical may also be employed, such as by thermal conduction from heated pipes placed in the soil volume to be dried. Alternatively, the soil, if initially permeable, can be dried by injection of dried air—preferably heated dried air.

Other arrangements of electrodes are possible such that low-frequency conduction heating can be employed to heat the deposit to 100° C. without the electrode temperature's exceeding the vaporization point of water. This may be done, as described in Bridges et al. U.S. Pat. No. 4,545,435, by placing two rows of electrodes on either side of the soil which is to be treated. The soil temperature between rows will increase to the desired temperature, but the electrode temperature will be lower because the electrodes are located near cool unheated soil.

What is claimed is:

1. A method for providing confinement of material in a porous medium in the earth comprising electrically heating a limited region of the porous medium by applying electric power between electrodes disposed in the earth to heat said region to temperature above that at which there is a substantial decrease in the conductivity of the material between the electrodes and below 300° C. to drive substantially all of the free water from open spaces of said medium in said region, thereafter introducing into said open spaces in said medium hydrocarbonaceous material in a liquid state which will set into a substantially impermeable, substantially solid structure, and setting said liquid material in said open spaces to form a substantially impermeable, substantially solid structure in said medium in said region.

2. A method according to claim 1 wherein said introducing and setting of said liquid material provide a substantially impermeable barrier in said region.

3. A method according to either one of claims 1 or 2 wherein said heating is continued above the boiling point of water to drive a substantial amount of free water from closed pores of said medium.

4. A method according to claim 3 wherein said liquid material has a contact angle in respect to said medium after said heating as to wet said medium to draw said liquid material into pores of said medium by capillary attraction.

5. A method according to claim 4 wherein said liquid material is normally solid at ambient temperature, is liquid at the temperature of said heated medium, is melted prior to its introduction into said spaces, and is set by cooling said medium.

6. A method according to claim 3 wherein said liquid material is normally solid at ambient temperature, is liquid at the temperature of said heated medium, is melted prior to its introduction into said spaces, and is set by cooling said medium.

7. A method according to either one of claims 1 or 2 wherein said heating is continued above the boiling point of water to drive a substantial amount of bound water from said medium.

8. A method according to claim 7 wherein said liquid material has a contact angle in respect to said medium after said heating as to wet said medium to draw said liquid material into pores of said medium by capillary attraction.

9. A method according to claim 8 wherein said liquid material is normally solid at ambient temperature, is liquid at the temperature of said heated medium, is melted prior to its introduction into said spaces, and is set by cooling said medium.

10. A method according to claim 7 wherein said liquid material is normally solid at ambient temperature, is liquid at the temperature of said heated medium, is melted prior to its introduction into said spaces, and is set by cooling said medium.

11. A method according to either one of claims 1 or 2 wherein said liquid material has a contact angle in respect to said medium after said heating as to wet said medium to draw said liquid material into pores of said medium by capillary attraction.

12. A method according to claim 11 wherein said liquid material is normally solid at ambient temperature, is liquid at the temperature of said heated medium, is melted prior to its introduction into said pores, and is set by cooling said medium.

13. A method according to either one of claims 1 or 2 wherein said liquid material is normally solid at ambient temperature, is liquid at the temperature of said heated medium, is melted prior to its introduction into said spaces, and is set by cooling said medium.

14. A method according to claim 13 wherein said liquid material is asphalt or low-density polyethylene.

15. A method according to either one of claims 1 or 2 wherein said liquid material is a thermosetting resin.

16. A method according to either one of claims 1 or 2 wherein said liquid material is a resin and said setting is performed by curing with a slowly acting curing agent.

17. A method according to either one of claims 1 or 2 wherein said heating is effected by bounding a volume of the earth including at least a portion of said region with two rows of electrodes, disposing a central row of electrodes between said two rows, and applying electric power between said central row of electrodes and said two rows of electrodes, and said liquid is introduced down electrodes of said central row.

18. A method according to either one of claims 1 or 2 wherein said heating is effected by applying electric power between said electrodes in a single row.

19. A method according to either one of claims 1 or 2 wherein said heating is effected by applying electric power between two rows of electrodes to vaporize water in the region between the rows while dissipating heat outwardly from near said electrodes to cooler regions of the earth outside said rows.

20. A method according to claim 2 wherein said impermeable barrier surrounds and contains a contained volume.

21. A method according to claim 20 wherein said impermeable barrier extends from the surface of the earth to a substantially impermeable zone in the earth.

22. A method according to claim 2 wherein said impermeable barrier extends from the surface of the earth around and under a contained volume.

23. A method according to claim 1 wherein said liquid medium upon setting is substantially leachproof and is introduced and set to encapsulate noxious material.

24. A method according to either one of claims 1 or 2 wherein said liquid material is injected into said medium under superatmosphere pressure, said pressure in pounds per square inch being less than 3 times the height of the overburden in feet.

* * * * *